United States Patent [19]

Guadalupi

[11] 4,055,627
[45] Oct. 25, 1977

[54] PROCESS FOR TREATING GASES IN THE AMMONIA SYNTHESIS

[76] Inventor: Mario Guadalupi, Via Tiziano, 18, Milan, Italy

[21] Appl. No.: 89,343

[22] Filed: Nov. 13, 1970

[30] Foreign Application Priority Data

Nov. 15, 1969  Italy ............................ 24469/69
May 29, 1970  Italy ............................ 25266/70
Aug. 27, 1970  Italy ............................ 29055/70

[51] Int. Cl. ..................................... C01b 2/30
[52] U.S. Cl. .......................................... 423/359
[58] Field of Search ..................... 23/61, 198, 199

[56] References Cited

U.S. PATENT DOCUMENTS

| | | | |
|---|---|---|---|
| 1,664,997 | 4/1928 | Slade et al. | 23/198 |
| 1,940,860 | 12/1933 | Hecker | 23/198 |
| 3,303,215 | 2/1967 | Otsuka et al. | 23/193 X |
| 3,310,376 | 3/1967 | Cook et al. | 23/199 |
| 3,349,569 | 10/1967 | Nebgen | 23/199 X |
| 3,388,968 | 6/1968 | Spielman et al. | 23/199 |
| 3,389,962 | 6/1968 | Moorhead | 23/193 |
| 3,395,990 | 8/1968 | Ballestra | 23/1 |

FOREIGN PATENT DOCUMENTS 1,115,952  6/1968  United Kingdom ............... 23/198

Primary Examiner—G. O. Peters

[57] ABSTRACT

In the synthesis of ammonia, a process is disclosed for treating the gases flowing from the synthesis reactor wherein those gases flow through a film absorber countercurrent to a cooled aqueous film to extract ammonia which is withdrawn as a strong solution from the absorber and scrubbed gases are combined for recycle with a stream of fresh feed which is then dehydrated by injecting liquid ammonia into the stream so that it rapidly expands and condenses the water vapor therein, and the dried gases are thereafter fed to the synthesis reactor.

13 Claims, 1 Drawing Figure

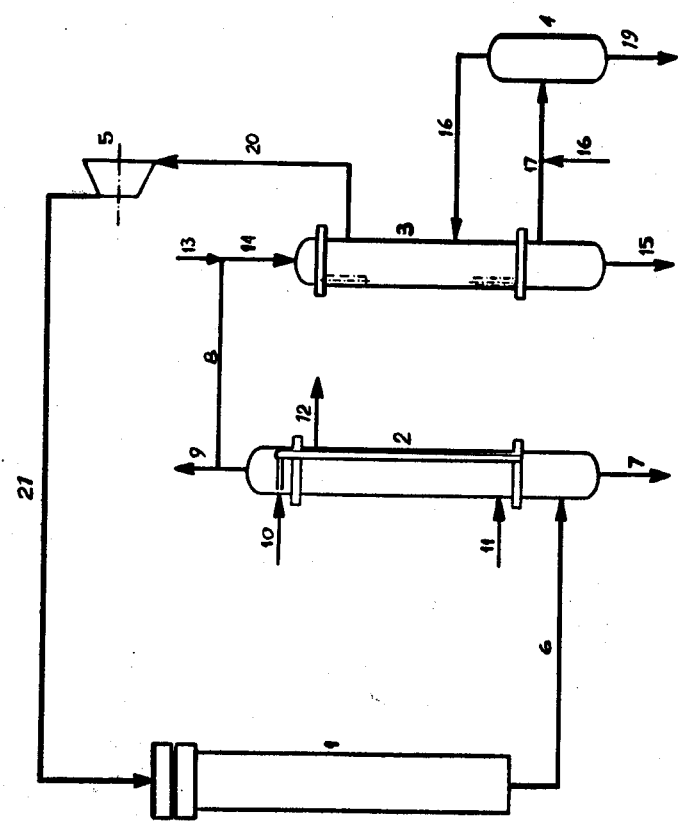

PROCESS FOR TREATING GASES IN THE AMMONIA SYNTHESIS

The present invention relates to a process for treating gases in the ammonia synthesis.

It is well known that in the ammonia synthesis plant the separation of ammonia from the non-reacted gases leaving the synthesis reactor is usually carried out by fractional condensation, first in a water-cooled condenser, then in one or more condensers cooled by evaporating ammonia.

The feeding of the fresh synthesis mixture occurs generally upstream of the final condensation stage cooled by evaporating ammonia, so as to remove the water contained in said feed.

Object of the present invention is a process for a complete treatment of the gaseous stream leaving the ammonia synthesis reactor both with reference to the ammonia separation and to the dehydration of recycle stream and fresh feed, allowing, as it will be evident from the following examples and description, several economical and operative advantages with respect to plants already known.

In the process according to the present invention, the gaseous stream leaving the synthesis reactor are sent, after a possible heat recovery and cooling, to a film absorber. In said apparatus the gaseous stream flows upwardly in countercurrent to a liquid film, consisting of either water or weak ammonia water solution, that absorbs the ammonia present in the gaseous stream; said apparatus is provided with cooling means to remove the heat of absorption of the ammonia. By means of the strong cooling of the liquid film and of the countercurrent mass transfer very strong ammonia solutions are obtained. The scrubbed gas leaving the absorber has a very low ammonia content (0.2+0.5% by mole) and is saturated with water.

After venting inert gases so as to keep constant their concentration in the cycle, the fresh feed is added to the gaseous stream before sending the whole stream to the dehydration stage.

The dehydration is carried out by injecting into the gaseous stream liquid ammonia which, by adiabatic evaporation, causes a strong cooling and the condensation of the water present therein.

The use of a suitable heat exchanger between the humid stream and the dried one allows to reach very low saturation temperatures ($-25° + -30°$ C.) with little amount of evaporated ammonia. The injected liquid ammonia is in excess with respect to the strictly necessary amount and this excess is removed from the cycle as a strong ammonia solution; the ammonia excess and, accordingly, the concentration of the outlet solution, are controlled so as to have no more than 2+3 ppm of water in the dried gas.

After the ammonia injection the stream is sent to a separator in which the above-mentioned strong ammonia solution and a dried gaseous stream are separated; the dried gases, after having passed as a cooling fluid through a heat exchanger in countercurrent with humid stream, go either to a compressor or to other suitable means and it is recycled to the synthesis reactor.

Most of the water present in the humid gases is condensed inside the heat exchanger and removed as a weak ammonia solution, the remaining water being removed with the strong ammonia solution coming from the separator. The ammonia solution obtained in this way is sent to a distilling zone where, according to known art, the ammonia is separated from the water at a high purity degree, i.e. 99.9%.

With reference to the drying method, it must be remarked that water has a high velocity of solution in ammonia and the higher the contact surface between gases to be treated and liquid ammonia the higher said velocity.

Given that the evaporation of liquid ammonia requires a certain time, these two facts can be utilized to achieve an excellent dehydration of the gases without saturating them with ammonia, by reducing the contact time. To this purpose, liquid ammonia is injected into the gaseous stream in an apparatus suitable to give a very high contact surface so as to allow to reduce the contact time with the above-mentioned results. By way of example only, this step can be carried out by speeding up the gases through a Venturi; liquid ammonia is injected into this apparatus, the high turbulence so obtained produces a high contact surface.

Downstream the Venturi, a separator, or other means suitable to reduce the contact surface, is provided. The higher the contact surface, the closer can be said separator, obtaining thereby an excellent dehydration without saturating the gases with ammonia as the reduced contact time is not enough long to evaporate the big amount of ammonia while high contact surface give good dehydration.

Another important aspect of the present invention, in the case in which part or all of the produced ammonia is utilized in the production of urea, is the possibility of utilizing part or all of the ammonia-water solution obtained in the film absorber to absorb the carbon dioxide contained in the raw ammonia synthesis gases coming from the carbon monoxide conversion stage; this absorption taking place in such conditions to produce ammonium carbamate which subsequently is sent to its conversion into urea, while the carbon dioxide free gases, after possible further treatments known in the art, are sent to the dehydration and to the ammonia synthesis.

The ammonia synthesis gases, constituted by $N_2 + 3H_2$, are generally produced by weak oxidation of hydrocarbons (i.e. steam reforming, partial oxidation with $O_2$ etc.); the produced gases are sent to further operations, i.e. carbon monoxide conversion, carbon dioxide and residual oxygenated carbon compounds removal.

With the process according to the present invention it is possible to avoid two expensive separation stages present in modern plants for the production of ammonia i.e. the carbon dioxide removal stage with solvent regeneration and the ammonia separation stage. Therefore, in suitable apparatus which allow to have a very high contact surface between gases and liquids, part or all of the ammonia-water solution obtained with the process according to the present invention can be utilized to remove the carbon dioxide present in the raw ammonia synthesis gases, obtaining in this way an ammonium carbamate solution which is subsequently sent to tis transformation into urea.

The absorption of the carbon dioxide can be conveniently effected in the pressure range usually employed in the urea synthesis processes. As above-mentioned, the carbon dioxide free gases are sent to the ammonia synthesis reactor after subjecting them to other known operations.

The invention will be better clarified with reference to the drawing herewith alleged wherein a particular form of realization of the invention is given only by way of unrestrictive example, not comprising the $CO_2$ absorption stage.

With reference to said drawing the effluents from the synthesis reactor 1, at a pressure ranging from 80 to 180 kg/cm$^2$, after possible heat recovery and cooling, not shown in the drawing, are sent through 6 to a film absorber 2 in which the gaseous stream flows upwardly inside vertical tubes in countercurrent with a liquid film flowing downwardly on the tube surface and absorbing the ammonia present in the gases. Said liquid can be either water or a weak ammonia solution and is fed to 2 through 10.

The ammonia heat of absorption is removed by water flowing outside the tubes, i.e. on the shell-side, said water being fed through 11 and leaving through 12. A strong ammonia solution comes out through 7 from the bottom of the film absorber and from its top through 8 comes out a gaseous stream with a very low remaining ammonia contente, i.e. 0.2 + 0.5% by mole, practically saturated with water and, after venting the inert gases through 9, the fresh feed is added through 13. The resultant gaseous stream is sent through 14 to the heat exchanger 3 wherein releases most of its heat content to the cooled dried gases entering through 18 and coming from the separator 4.

This cooling action causes the condensation of most of the water contained in the gases, in this way from the bottom of exchanger 3, through 15, a weak ammonia solution is withdrawn. The drying is completed by injecting into the gases coming from 3 through 17 liquid ammonia which by adiabatic evaporating into the gas stream causes its cooling and accordingly the condensation of the contained water. Said liquid ammonia is sent into 17 through 16.

The resulting mixture enters separator 4, a strong ammonia solution is withdrawn from the bottom of said separator through 19, a dried gaseous stream leaves said separator through 18 and contains no more than 2 + 3 ppm of water and is sent as cooling fluid, to the heat exchanger 3; the gases then through 20 and 21 go the compressor 5 which recycles them to the synthesis reactor 1.

For illustrative purposes only, reference is made to the following example which specifies conditions and advantages of treating the gases of the ammonia synthesis in accordance with the process of the present invention.

EXAMPLE

The present example relates to a synthesis plant for the production of 1200 ton/day of ammonia.

A stream of 780.930 Nm$^3$/hr leaves the synthesis reactor; said stream had the following composition at a pressure of 125 absolute atmospheres:
$H_2$: 58.99% by volume
$N_2$: 19.68% by volume
$CH_4$: 7.58% by volume
AR: 3.25% by volume
$NH_3$: 10.50% by volume after cooling said stream down to 40° C. it was sent to the bottom of the film absorber 2. 48.969 kg/hr of 10% b.w. ammonia solution were sent to the top of the absorber. 108.865 kg/hr of an ammonia solution, 60% b.w. of ammonia leaves absorber 2 through 7 and 701.190 Nm$^3$/hr of washed gases through 8.

Said gases, at a temperature of 45° C., had the following composition on dry basis:
$H_2$: 65.59% by volume
$N_2$: 21.90% by volume
$CH_4$: 8.40% by volume
Ar: 3.61% by volume
$NH_3$: 0.50% by volume
saturation water 525 kg/hr.

10.900 Nm$^3$/hr of said gases were vented through 9. The fresh feed mixture, introduced through 13, had the following characteristics:
Flow rate: 142.170 Nm$^3$/hr
Composition:
$H_2$: 74.17% by volume
$N_2$: 24.92% by volume
$CH_4$: 0.82% by volume
Ar: 0.29% by volume
Saturation water 60 kg/hr.

The two gas streams were mixed before entering exchanger 3, the whole stream had the following characteristics:
Flow rate: 832.460 Nm$^3$/hr
Pressure: 122 absolute atmospheres
Temperature: 44° C.
Composition (on dry basis)
$H_2$: 68.08% by volume
$N_2$: 22.35% by volume
$CH_4$: 7.12% by volume
Ar: 3.04% by volume
$NH_3$: 0.41% by volume
Saturation water 607 kg/hr At the outlet of the exchanger the stream had the following characteristics:
a. gas
temperature: −18.5° C.
water content: 35 kg/hr
b. ammonia solution
flow rate: 818 kg/hr
ammonia content: 30% by weight
water content: 70% by weight The liquid ammonia injected was 10.665 kg/hr and evaporating almost completely, it cooled the gaseous stream from −18.5° C. to −28° C.

Separator 4 gave at equilibrium:
a. 350 kg/hr of 90% b.w. ammonia solution
b. 846.000 Nm$^3$/hr of gases having the following composition:
$H_2$: 66.0% by volume
$N_2$: 22.0% by volume
$CH_4$: 7.0% by volume
Ar: 3.0% by volume
$NH_3$: 2.0% by volume
$H_2O$: < 3 ppm From what above said all the economical and operative advantages of the process according to the present invention are well evident. These advantages derive from the excellent absorption of the ammonia in the film absorber; the absorption is favoured by the cooling means, foreseen in said apparatus, which removes the heat developed during the absorption.

The advantages of the new drying method for recycle gases and for fresh feed are also evident; said new method with very simple equipment allows a very good drying and in the same time a very good thermal efficiency.

It is also worthy of mention that the process according to the present invention can be partly used in conventional processes for the synthesis of ammonia in the sense that either only the absorption stage with the film absorber or only the dehydration stage for recycled and fresh feed gases with ammonia quench and heat exchanger, can be utilized in plants making use in other parts of known method and apparatuses.

What I claim is:

1. A process for treating the effluent gases from an ammonia synthesis reactor and for recycling such gases with fresh gases to such reactor comprising the following steps:

absorbing ammonia contained in the effluent gases discharged from the synthesis reactor in the liquid film of a film absorber and obtaining a strong ammonia solution;

blending the effluent gases discharged from said liquid film absorber with fresh gases for feed to said reactor into a heat exchanger and condensing the water contained in the blended effluent and fresh gases;

removing the condensed water from said heat exchange as a weak ammonia solution;

injecting liquid ammonia into gases discharged from said heat exchanger;

feeding said discharged gases with said liquid ammonia injected therein into a separator and separating from said feed in said separator cooled dry gases and a strong solution of ammonia;

feeding said cooled dry gases from said separator into said heat exchanger to cool and condense the water in the blended effluent and fresh gases being fed into said heat exchanger; and feeding said blended effluent and fresh gases, after the water contained therein has been condensed, from said heat exchanger to said ammonia synthesis reactor.

2. A process according to claim 1, in which the effluent gases discharged from the synthesis reactor are fed in countercurrent flow through the tubes of a vertical tube exchanger with a liquid flim flowing downwardly in such tubes, said downwardly flowing liquid film absorbing ammonia from said countercurrent flowing effluent gases.

3. A process according to claim 2, in which the heat of absorption of said ammonia from said effluent gases into said liquid film in said vertical tube exchanger is removed by passing a cooling liquid through the shell of said exchanger.

4. A process according to claim 1, in which said liquid ammonia is injected into said gases discharged from said heat exchanger and by adiabatic evaporation causes a cooling of said solution and the dry gases separated therefrom in said separator.

5. A process according to claim 3, in which said liquid ammonia is injected into said gases discharged from said heat exchanger by adiabatic evaporation and causes a cooling of said solution and the dry gases separated therefrom in said separator.

6. A process according to claim 4 in which said cooled dry gases discharged from said separator are fed into said heat exchanger and flow in said heat exchanger in countercurrent flow to the blended effluent and fresh gases therein.

7. A process according to claim 5 in which said cooled dry gases discharged from said separator are fed into said heat exchanger and flow in said heat exchanger in countercurrent flow to the blended effluent and fresh gases therein.

8. A process according to claim 1 in which said liquid ammonia injected into said gases discharged from said heat exchanger is the strong ammonia solution obtained from said film absorber.

9. A process according to claim 7 in which the residual water content of the dried blended effluent and fresh gases fed from said heat exchanger is not higher than 2 to 3 ppm.

10. A process according to claim 1 in which the residual ammonia content of the effluent gases discharged from said liquid film absorber is from 0.2 to 0.5% by mole.

11. A process according to claim 1 in which the liquid ammonia injected into said gases discharged from said heat exchanger is injected through a venturi so that the turbulence and contact surface between the liquid ammonia and gases is increased.

12. A process according to claim 1 in which the process for treating the effluent gases from the ammonia synthesis reactor and for recycling such gases with fresh gases to such reactor is performed at pressures from 30 to 300 kg/cm$^2$.

13. A process according to claim 12 in which the process is performed at pressures from 80 to 150 Kg/cm$^2$.

* * * * *

UNITED STATES PATENT AND TRADEMARK OFFICE
CERTIFICATE OF CORRECTION

PATENT NO. : 4,055,627
DATED : October 25, 1977
INVENTOR(S) : Mario Guadalupi

It is certified that error appears in the above-identified patent and that said Letters Patent are hereby corrected as shown below:

First page, After line "[76]" insert the following line

--[73] Assignee: Snamprogetti, S.p.A., Milan, Italy--.

Column 2, line 22, After "surface" change the semi-colon ";" to a comma --,--.

line 62, Correct spelling of "its".

Column 3, line 22, Correct spelling of "content".

line 43, After "go" insert --to--.

line 61, Correct "AR" to read --Ar--.

Signed and Sealed this

Twenty-first Day of February 1978

[SEAL]

Attest:

RUTH C. MASON
Attesting Officer

LUTRELLE F. PARKER
Acting Commissioner of Patents and Trademarks